United States Patent [19]

Miller et al.

[11] Patent Number: 4,488,809
[45] Date of Patent: Dec. 18, 1984

[54] PLANIZING TARGET

[75] Inventors: John M. Miller, Huntington Station; Richard O. Barton, Levittown, both of N.Y.

[73] Assignee: Grumman Aerospace Corporation, Bethpage, N.Y.

[21] Appl. No.: 369,800

[22] Filed: Apr. 19, 1982

[51] Int. Cl.³ .............................................. G01C 15/06
[52] U.S. Cl. ...................................... 356/138; 33/293
[58] Field of Search ....................... 356/138, 153, 399; 33/286, 293

[56] References Cited

U.S. PATENT DOCUMENTS

| 159,021 | 1/1875 | Davies | 33/293 |
| 173,938 | 2/1976 | Gieseler | 33/293 |

Primary Examiner—R. A. Rosenberger
Attorney, Agent, or Firm—John P. Kozma; Richard G. Geib; Daniel J. Tick

[57] ABSTRACT

A unitary targeting device is used to align a machined plane of a workpiece, for instance an industrial assembly fixture, with the optical axis of a reference instrument. The disclosed device and method are designed to fully utilize the depth of field of the reference instrument to sense misalignment in a single sighting.

7 Claims, 9 Drawing Figures

PLANIZING TARGET

BACKGROUND OF THE INVENTION

There are various standard optical telescopic instrument systems in general industrial use for the purpose of establishing a precise coordinate reference measurement and alignment capability for the economic construction of very large fixtures and equipments. These systems have been devised to set up precise horizontal and vertical planes that are mutually perpendicular and to provide an ability to set up or measure the distance between parallel planes within a predetermined coordinate reference system.

The positioning of fixture or equipment components is usually carried out by banking a minimum of three scales against the component machined surface, viewing the offset errors and through an iteration process of adjustment and sighting bring each component to the desired location within the coordinate reference geometry. A similar technique and special apparatus for measuring the straightness of a lumber cut is described in U.S. Pat. No. 4,085,512 to Bod et al.

An undesirable aspect of the above-described scheme is that each of three scales must be checked whenever a position adjustment of the fixture is necessitated, involving re-aiming and re-focusing the telecope for each scale until the proper alignment is observed.

An early surveyor's target for a leveling rod is described in U.S. Pat. No. 405,058, issued to Thompson. The Thompson target is designed to eliminate a cosine error scaling in a linear displacement measurement from a single point on a surface. This is accomplished by aligning a centerline on a pair of angularly disposed target halves with the cross hairs of a sighting telescope. While requiring only a single sighting to sense whether the linear displacement scale is properly aligned, the Thompson target is not designed to sense the attitude or angular orientation of the surface on which the rod rests.

In general, the positioning of any fixture requires control over both angular rotation about and linear displacement along each of three axes in a reference coordinate system. It is desirable, then, to sense misalignment in as many as possible of six degrees of spatial freedom in a single telescope sighting.

SUMMARY OF THE PRESENT INVENTION

It is a fundamental object of the present invention to provide a targeting device that gives an observer a full sense of the misalignment of a machined plane from the optical axis of a reference telescope, using a single, fixed-focus sighting on the targeting device.

It is another object of this invention to provide a method for determining the alignment of machined plane which utilizes the full depth of field available in a typical alignment instrument over the usual working distances in industrial metrology.

Yet another object of the present invention is to provide a targeting device which accurately indicates misalignment of a machined plane in each of three degrees of spatial freedom.

These and other objects and advantages of the present invention are realized in brief of providing a unitary alignment target having a flat banking surface which is held against the machined surface requiring orientation. A continuous target pattern is marked on another surface of the alignment target so as to be viewable through a reference telescope. The target pattern is adapted to extend through a substantial portion of the depth of field of the telescope while precisely paralleling the machined plane. Thus, in a single sighting, angular misalignment about two axes as well as displacement along a third may be sensed.

BRIEF DESCRIPTION OF THE DRAWINGS

The above and other features and advantages of the present invention will be better understood with reference to the appended drawings, in which.

DETAILED DESCRIPTION OF PREFERRED EMBODIMENT

Figure 1:
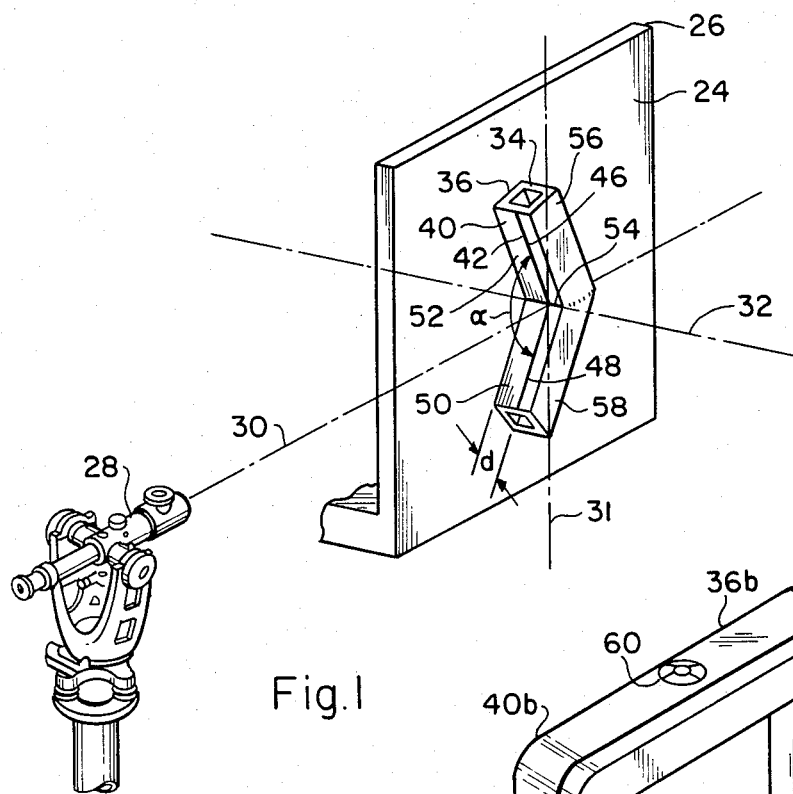
FIG. 1 is an isometric view of one embodiment of the present invention in a typical application.

FIG. 1 shows an isometric view of a physical embodiment of the present invention. A functional plane requiring alignment is manifested as a flat surface 24 on a workpiece 26. Typically workpiece 26 will be part of a machining or assembly fixture, and the orientation of telescope 28 will define a three-axis coordinate reference system. Thus, pitch refers to rotation about the line-of-sight (LOS) 30 of telescope 28, yaw to angular movement about a vertical normal 31 to LOS 30, and roll to rotation about horizontal normal 32. Similarly, linear migrations along axes 30, 31 and 32 are referred to as depth, vertical and horizontal displacements respectively.

A unitary alignment target 34 constructed in accordance with the present invention has a flat banking surface 36 which is held against the workpiece surface 24. Marked on a non-planar surface 40 extending from surface 36 is a continuous target pattern 42 parallel to and spaced a distance d from banking surface 36. Preferably pattern 42 is etched on surface 40, although in practice, any continuous marking viewable through telescope 28 will suffice, so long as it is everywhere maintained at a precise distance from (i.e., in parallel relationship with) surface 36.

Preferably, through not necessarily, surface 40 is perpendicular to the banking surface 36. It will be appreciated that the shape of target pattern 42 will correspond to the non-planar character of surface 40. In the embodiment shown in FIG. 1, pattern 42 includes two linear segments 46 and 48 joined to form an angle α, preferably a right angle, and surface 40 includes two planar surfaces 50 and 52 intersecting at the same angle α along a line 54. Thus, target 34 may be formed by joining two sections 56 and 58 of hollow, rectangular cross-section stock at a right angle.

FIGS. 2, 3, 4 and 5 illustrate several further embodiments, although it will be understood that the present invention is not limited to these configurations.

Figure 2:
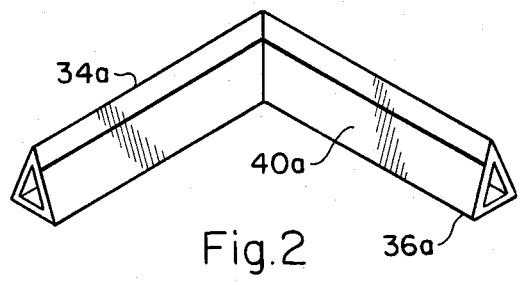
FIGS. 2, 3, 4 and 5 are isometric views of further embodiments.

FIG. 2 shows a target 34a formed, like target 34, in the shape of an "L", but from triangular rather than rectangular stock. It will be appreciated that surface 40a of target 34a, while not perpendicular to banking surface 36a, will nonetheless be viewable through telescope 28 when positioned similarly to target 34.

Figure 3:
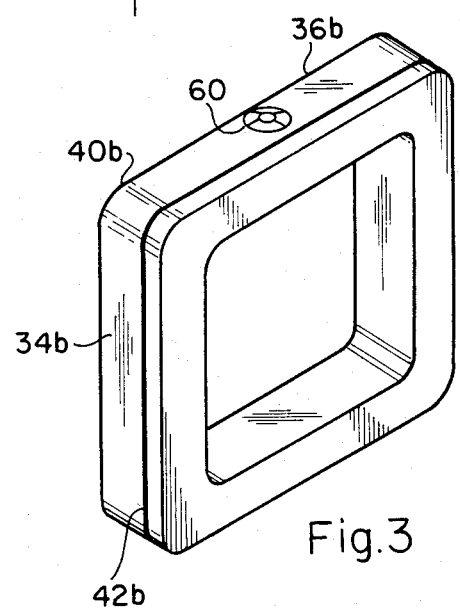

Alignment targets may also, within the scope of this invention, assume other geometric shapes besides an "L". FIG. 3 shows a rectangular target 34b, FIG. 4 a semicircular target 34c, and FIG. 5 an inverted "T" shaped target 34d. In general, any shape which may be marked with a continuous pattern that will extend through a substantial portion of the reference telescope's depth of field may be used to model an alignment target according to the present invention.

Figure 4:
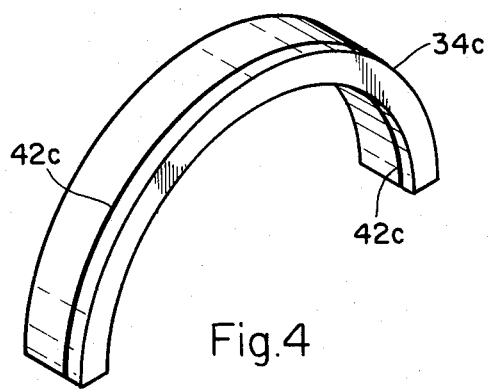
Figure 5:
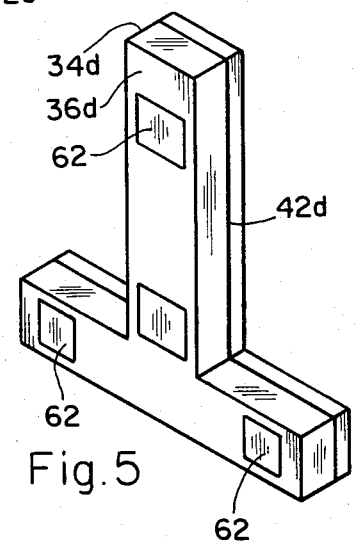

FIGS. 3, 4 and 5 also illustrate examples of modifications of the general target configuration. These variations may be adopted alone or in combination, as desired, depending on the requirements of a particular application.

Thus, rectangular target 34b of FIG. 3 includes a bubble level 60 mounted perpendicularly with respect to banking surface 36b. Preferably, target 34b would be supported by a ledge extending horizontally from the workpiece surface to be aligned, allowing pitch and roll adjustments to be made with respect to the gravity vector. In order to obtain the necessary extension of target pattern 42B through the depth of field, the reference telescope should be either raised or lowered with respect to target 34b.

To be viewable at any roll angle with respect to the reference telescope, the semicircular target 34c of FIG. 4 includes a target pattern 42c marked all around the target. An example of means for holding the target against the workpiece surface is included in target 34d. As shown in FIG. 5, banking surface 36d of target 34d includes flush mounted magnets 62.

Again, the particular features discussed above are presented by way of example only, as various other modifications will be obvious to those skilled in the art.

Figure 6A:
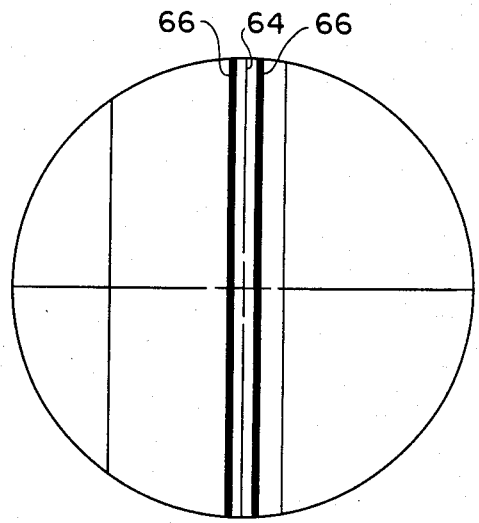
FIGS. 6a, b, c and d exemplify the operation of the present invention.
Figure 6B:
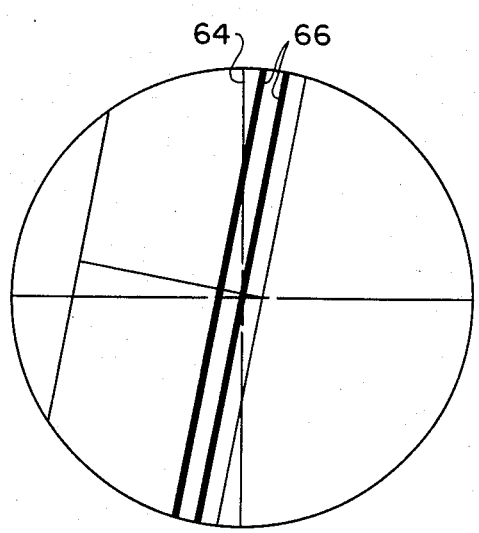
Figure 6C:
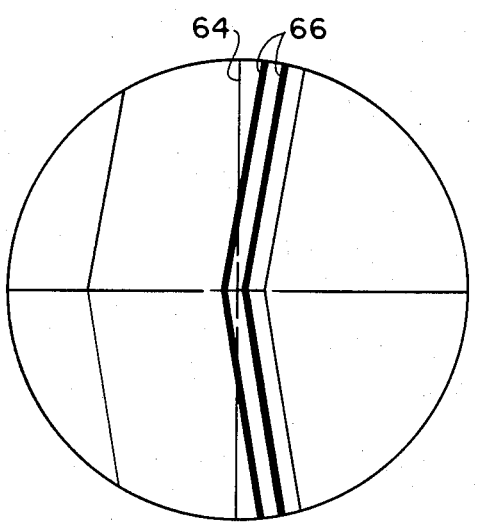
Figure 6D:
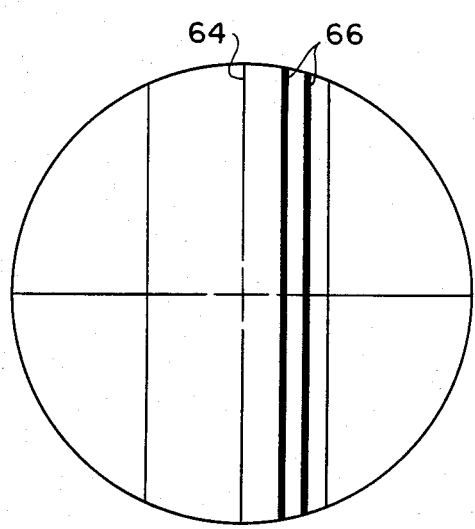

The operation of the present invention is explained with reference to the exemplary application of FIG. 1. FIGS. 6a, b, c and d are views through telescope 28 representing different states of alignment of workpiece 26 with respect to the reference coordinate system. In each, a vertical cross-hair 64 defines the vertical reference axis 31. In FIG. 6a, cross-hair 64 lies entirely between a pair of bifilar lines 66 which define the target pattern 42, indicating that surface 24 is properly aligned with the reference system with respect to pitch, yaw and horizontal displacement. FIG. 6b represents the situation wherein workpiece 26 is misaligned in pitch only. A yaw misalignment is illustrated in FIG. 6c, while FIG. 6d shows a horizontal linear displacement.

In general, the target pattern of the present invention defines a plane which is to be aligned with the telescope line of sight. If LOS 30 lies within this plane target pattern 42 will appear as a straight line in telescope 28, but any deviation of the target pattern plane from LOS 30 will make manifest the nonlinear character of the target pattern. By appropriately scaling the telescope reticle, the apparent degree of nonlinearity of the target pattern may be related to the angle of yaw misalignment. The pitch and horizontal misalignments may be measured in a similar fashion.

Of course, the alignment target of this invention may be used for aligning horizontal as well as vertical machined surfaces, by aligning the target pattern with the telescope's horizontal rather than vertical cross hair. For vertical planes, pitch, roll and vertical displacement are sensed. For oblique workpiece surfaces, the target may incorporate micrometer means for adjusting the relative angle between the target pattern and the banking surface, so that the target pattern may be made horizontal or vertical by adjusting the banking surface to the desired orientation of the machined surface.

In keeping with the depth of field of current optical instruments, the target pattern should extend through at least 4-6 inches in each of two dimensions. Targets thus constructed may accurately sense all but the most minute angular misalignment, since a resolution of on the order of a-thousandth of an inch will be obtainable throughout the telescope's field of view, using one fixed focus sighting.

As pointed out throughout the foregoing description, numerous configurations of the sighting target, as well as other variations in the present invention, will be obvious to those skilled in the art. For this reason, the foregoing description of a preferred embodiment should be considered by way of example only, the scope of the present invention being defined by the claims which follow.

What is claimed is:

1. A unitary alignment target comprising:
   a planar banking surface which is held against a planar surface of an industrial fixture;
   a non-planar surface extending from the banking surface; and
   a continuous target pattern marked on the non-planar surface so as to be parallel to the banking surface whereby said target pattern also parallels the fixture surface when the banking surface is held thereagainst, said target pattern being viewable through a telescope having a line of sight and a cross hair which define a reference plane with which the fixture surface is to be aligned.

2. The target of claim 1 in which the non-planar surface is perpendicular to the banking surface.

3. The target of claim 1 in which the non-planar surface includes two intersecting planar surfaces.

4. The target of claim 1 which further comprises a bubble level mounted perpendicularly with respect to the banking surface.

5. The target of claim 1 which further comprises means for holding the banking surface against the work piece surface.

6. The target of claim 1 in which the continuous target pattern comprises a pair of bifilar lines.

7. In a system for determining whether a fixture is aligned with a reference plane defined by a line of sight and a cross hair of a reference telescope, the improvement which comprises a unitary alignment target having a planar banking surface, a non-planar surface perpendicular to the flat surface, and a continuous target pattern marked on the non-planar surface so as to be parallel to and spaced a predetermined fixed distance from the banking surface, said continuous target pattern being viewable from the reference telescope when the banking surface is held against a planar surface.

* * * * *